(12) United States Patent
Kovach

(10) Patent No.: US 9,769,973 B2
(45) Date of Patent: Sep. 26, 2017

(54) ATTACHMENT ARRANGEMENT WITH DOUBLE SHEAR CONFIGURATION FOR FRAME MEMBERS OF AN AGRICULTURAL TILLAGE IMPLEMENT

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/452,907

(22) Filed: Aug. 6, 2014

(65) Prior Publication Data

US 2015/0053446 A1 Feb. 26, 2015

Related U.S. Application Data

(60) Provisional application No. 61/868,262, filed on Aug. 21, 2013.

(51) Int. Cl.
| | |
|---|---|
| *A01B 51/00* | (2006.01) |
| *A01B 23/04* | (2006.01) |
| *A01B 49/02* | (2006.01) |
| *A01B 21/08* | (2006.01) |

(52) U.S. Cl.
CPC ............ *A01B 51/00* (2013.01); *A01B 23/046* (2013.01); *A01B 49/02* (2013.01); *A01B 21/083* (2013.01)

(58) Field of Classification Search
CPC ..... A01B 73/044; A01B 73/046; A01B 35/30; A01B 51/00; A01B 61/00–61/025; A01B 63/22; A01B 63/145; A01B 63/163; A01B 23/043; A01B 23/046; A01B 3/40–3/468; A01B 5/00; A01B 5/04; A01B 9/003; A01B 13/08; A01B 15/14; A01B 19/00–19/10
USPC .................................................. 172/776, 311
See application file for complete search history.

(56) References Cited

U.S. PATENT DOCUMENTS

| | | | | |
|---|---|---|---|---|
| 1,848,085 | A * | 3/1932 | Eisenschmidt | 403/187 |
| 2,545,111 | A * | 3/1951 | Schaubert | 172/413 |
| 3,223,178 | A * | 12/1965 | Jones et al. | 172/582 |
| 3,261,409 | A * | 7/1966 | Peterson et al. | 172/326 |
| 3,470,965 | A * | 10/1969 | Quickstad | 172/311 |
| 3,572,783 | A * | 3/1971 | Sosalla | 403/3 |
| 3,774,693 | A * | 11/1973 | Orthman | 172/311 |
| 3,878,901 | A | 4/1975 | Robertson, Sr. | |
| 3,990,521 | A | 11/1976 | Ankenman et al. | |
| 4,029,155 | A * | 6/1977 | Blair et al. | 172/763 |
| 4,044,842 | A | 8/1977 | Worick | |

(Continued)

*Primary Examiner* — Robert Pezzuto
*Assistant Examiner* — Adam Behrens
(74) *Attorney, Agent, or Firm* — Rebecca L. Henkel; Rickard K. DeMille

(57) ABSTRACT

An agricultural tillage implement includes a carriage frame assembly having a longitudinal frame member extending in a travel direction, and a cross frame member extending transverse to the longitudinal frame member. A horizontal attachment arrangement interconnects the longitudinal frame member with the cross frame member. The horizontal attachment arrangement includes a generally vertical first plate attached to the longitudinal frame member and having a first through hole, a generally vertical second plate attached to the cross frame member and having a second through hole, and a pivot pin extending through each of the first through hole and the second through hole.

11 Claims, 8 Drawing Sheets

(56) References Cited

U.S. PATENT DOCUMENTS

| | | | |
|---|---|---|---|
| 4,082,311 A * | 4/1978 | Hamman | 280/507 |
| 4,109,928 A * | 8/1978 | Watkins | 172/311 |
| 4,136,741 A | 1/1979 | Rambach | |
| 4,151,886 A * | 5/1979 | Boetto et al. | 172/311 |
| 4,186,805 A * | 2/1980 | Repski | 172/248 |
| 4,232,747 A * | 11/1980 | Pfenninger et al. | 172/311 |
| 4,243,105 A * | 1/1981 | Vogel et al. | 172/311 |
| 4,271,912 A * | 6/1981 | Frye | 172/441 |
| 4,327,932 A * | 5/1982 | Anderson | 172/311 |
| 4,453,601 A * | 6/1984 | Orthman et al. | 172/311 |
| 4,494,883 A * | 1/1985 | Winter | 384/439 |
| 4,502,545 A * | 3/1985 | Couser | 172/311 |
| 4,579,179 A * | 4/1986 | Vachon | 172/395 |
| 4,619,330 A | 10/1986 | Machnee | |
| 4,655,295 A * | 4/1987 | Barnes | A01B 15/18 172/191 |
| 4,676,321 A | 6/1987 | Friggstad | |
| 4,723,787 A * | 2/1988 | Hadley et al. | 172/311 |
| 4,790,389 A | 12/1988 | Adee et al. | |
| 4,840,233 A | 6/1989 | Friggstad et al. | |
| 4,844,173 A * | 7/1989 | Swartzendruber | A01B 23/046 172/1 |
| 4,881,603 A * | 11/1989 | Hartman | 172/311 |
| 4,977,964 A * | 12/1990 | Friggstad et al. | 172/310 |
| 5,265,898 A * | 11/1993 | Houck | 280/413 |
| 5,535,832 A * | 7/1996 | Benoit | A01B 49/02 172/195 |
| 5,540,290 A * | 7/1996 | Peterson et al. | 172/311 |
| 5,628,373 A * | 5/1997 | Domries | 172/574 |
| 5,707,170 A * | 1/1998 | Wattonville | 403/391 |
| 5,787,988 A * | 8/1998 | Harlan et al. | 172/311 |
| 6,016,877 A * | 1/2000 | Noonan et al. | 172/776 |
| 6,068,062 A | 5/2000 | Brueggen et al. | |
| 6,082,467 A * | 7/2000 | Friesen | 172/630 |
| 6,408,950 B1 * | 6/2002 | Shoup | 172/311 |
| 6,609,574 B1 * | 8/2003 | Collins | 172/311 |
| 6,675,907 B2 * | 1/2004 | Moser et al. | 172/311 |
| 6,925,735 B2 | 8/2005 | Hamm et al. | |
| 7,021,394 B2 * | 4/2006 | Marchesan | 172/311 |
| 7,073,604 B1 * | 7/2006 | Dobson et al. | 172/311 |
| 7,543,657 B2 | 6/2009 | Friggstad | |
| 7,578,356 B2 * | 8/2009 | Newman | 172/572 |
| 7,766,576 B2 * | 8/2010 | Connell et al. | 403/400 |
| D623,669 S * | 9/2010 | Kromminga | A01B 49/02 D15/27 |
| 7,837,169 B2 * | 11/2010 | Denis | 248/316.8 |
| 7,854,271 B2 * | 12/2010 | Naylor et al. | 172/126 |
| 8,122,970 B2 * | 2/2012 | Palen | 172/311 |
| 8,261,846 B2 * | 9/2012 | Fraley et al. | 172/776 |
| D668,687 S * | 10/2012 | Kromminga | D15/11 |
| 8,468,655 B2 * | 6/2013 | Borkgren et al. | 16/348 |
| 8,601,781 B2 * | 12/2013 | Steenhoek et al. | 56/375 |
| 8,794,343 B2 * | 8/2014 | Kromminga | 172/149 |
| 8,794,346 B2 * | 8/2014 | Blunier et al. | 172/614 |
| 2003/0132013 A1 * | 7/2003 | Steinlage | 172/705 |
| 2004/0050563 A1 * | 3/2004 | Shoup | 172/311 |
| 2004/0069510 A1 * | 4/2004 | Dobson et al. | 172/311 |
| 2009/0025946 A1 * | 1/2009 | Kovach et al. | 172/573 |
| 2009/0101369 A1 * | 4/2009 | Marggi | 172/1 |
| 2010/0101811 A1 * | 4/2010 | Friggstad et al. | 172/1 |
| 2011/0017480 A1 * | 1/2011 | Thompson et al. | 172/1 |
| 2011/0258811 A1 * | 10/2011 | Borkgren et al. | 16/319 |
| 2013/0032365 A1 * | 2/2013 | Houck | 172/311 |
| 2013/0199807 A1 * | 8/2013 | Hoffman | A01B 49/027 172/1 |
| 2014/0034341 A1 * | 2/2014 | Fast | 172/311 |
| 2014/0345888 A1 * | 11/2014 | Dames et al. | 172/1 |

\* cited by examiner

ATTACHMENT ARRANGEMENT WITH DOUBLE SHEAR CONFIGURATION FOR FRAME MEMBERS OF AN AGRICULTURAL TILLAGE IMPLEMENT

CROSS REFERENCE TO RELATED APPLICATIONS

This is a non-provisional application based upon U.S. provisional patent application Ser. No. 61/868,262, entitled "ATTACHMENT ARRANGEMENT WITH DOUBLE SHEAR CONFIGURATION FOR FRAME MEMBERS OF AN AGRICULTURAL TILLAGE IMPLEMENT", filed Aug. 21, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through the fields by a tractor, for example, a cultivator/harrow which is capable of simultaneously tilling and leveling the soil in preparation for planting. This implement includes a cultivator that is towed by a tractor and a harrow that is towed by the cultivator.

In one type of tilling operation, rows or gangs of circular disk blades are pulled through the soil at variable depths to break up clods of soil, as well as old plant material to provide a more amenable soil structure for planting and to level the soil surface. The gangs of disks are arranged on frames that extend generally laterally with respect to the direction of movement through a field and more particularly are angled with respect to the direction of movement.

Frame members of tillage implements are typically mounted using vertical bolts and the bolts are stressed in tension. As a result, the bolts will stretch or break at the minor diameter of the threads due to the smaller sectional area at the minor diameter of the threads. Likewise, since the bolts are torqued to keep the nuts tight, there is little room for additional stresses which are a result of field loading.

What is needed in the art is a tilling implement with frame members that are mounted using a stronger connection.

SUMMARY OF THE INVENTION

The present invention provides a tillage implement with intersecting frame members which are connected together using a horizontal attachment arrangement with a double shear configuration, thereby reducing the stress in the joint.

In one form, the invention is an agricultural tillage implement including a carriage frame assembly having a longitudinal frame member extending in a travel direction, and a cross frame member extending transverse to the longitudinal frame member. A horizontal attachment arrangement interconnects the longitudinal frame member with the cross frame member. The horizontal attachment arrangement includes a generally vertical first plate attached to the longitudinal frame member and having a first through hole, a generally vertical second plate attached to the cross frame member and having a second through hole, and a pivot pin extending through each of the first through hole and the second through hole.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
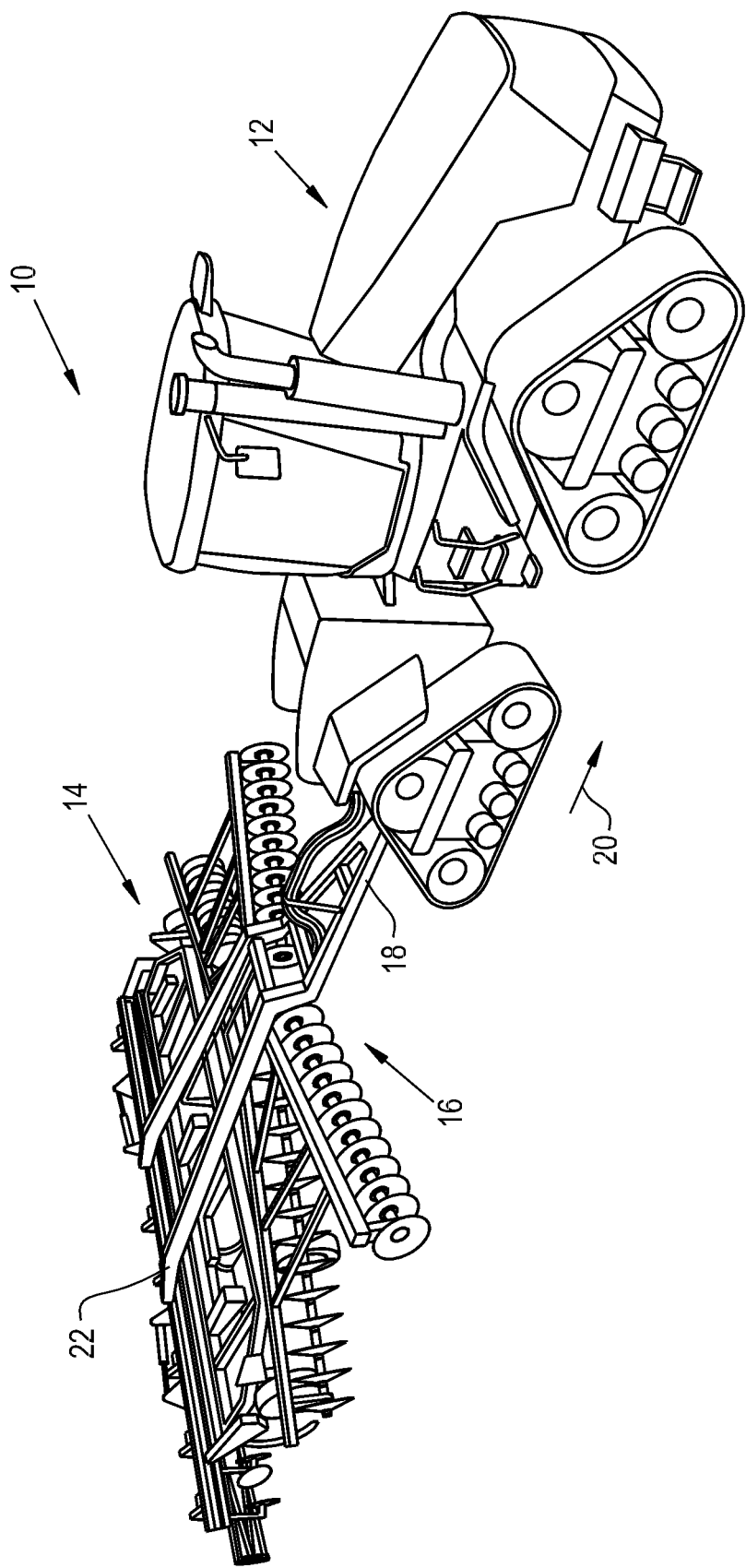
FIG. 1 illustrates an embodiment of a tillage implement of the present invention being pulled by a tractor.
Figure 2:
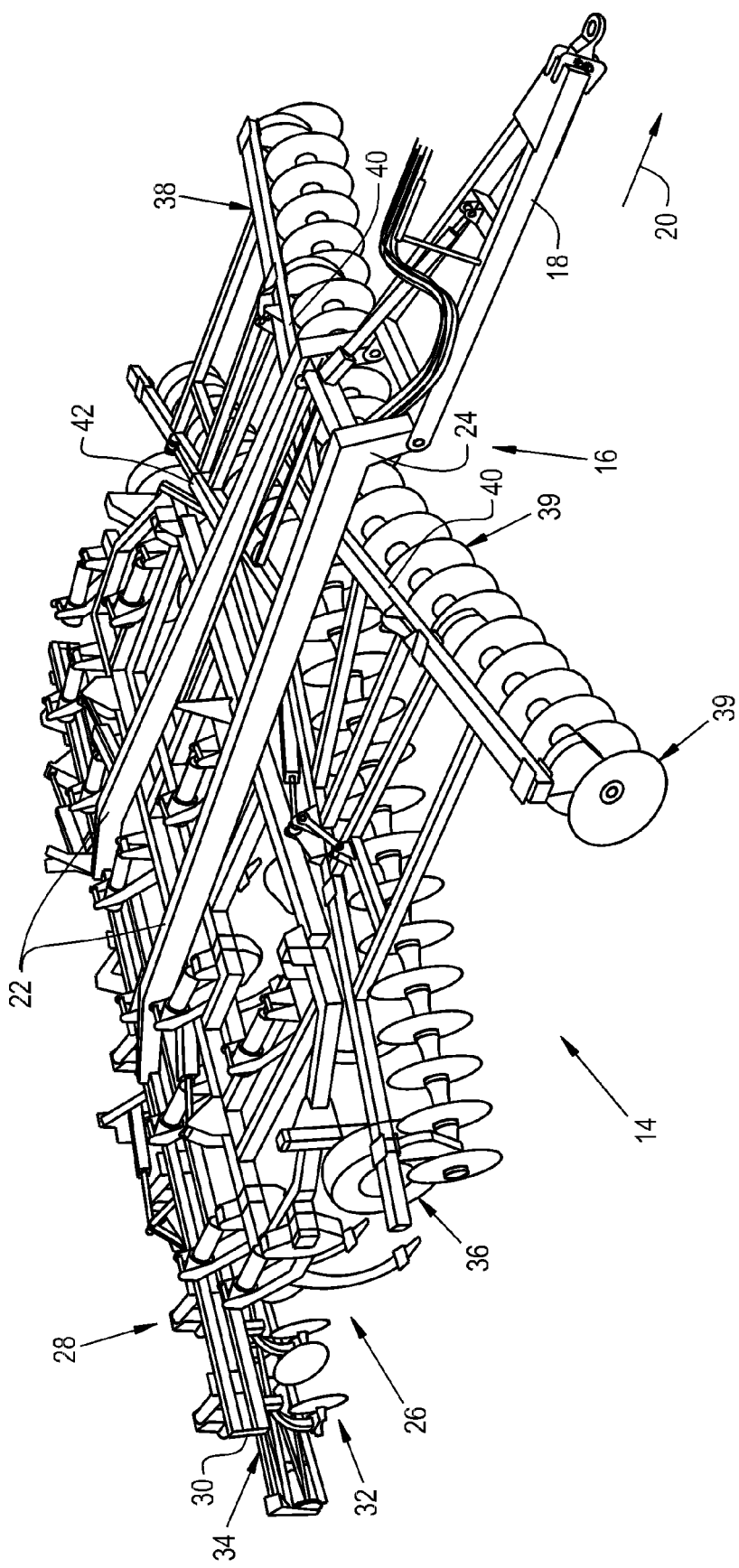
FIG. 2 is a perspective view of the tillage implement of FIG. 1.
Figure 3:
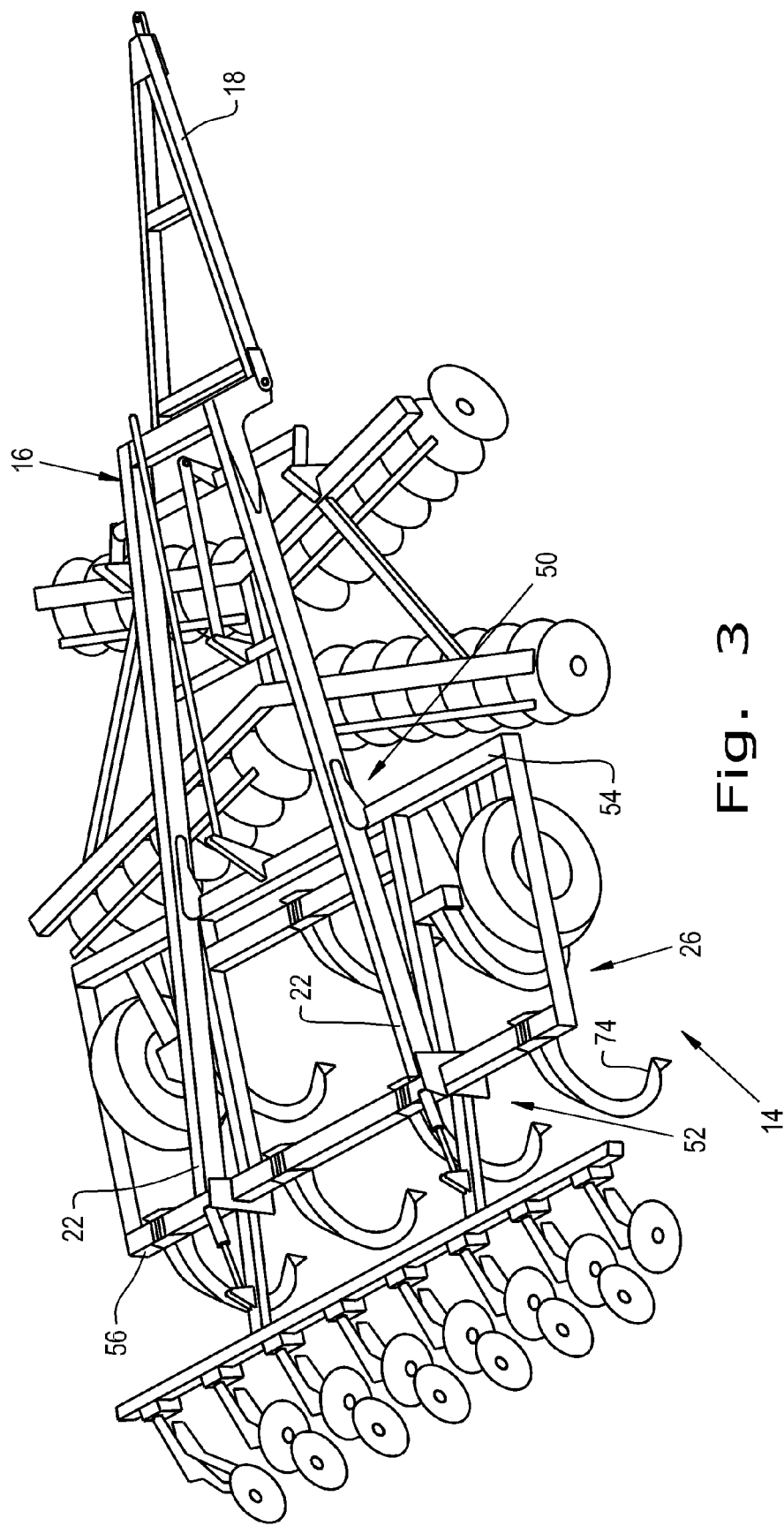
FIG. 3 is another perspective view of the tillage implement of FIGS. 1 and 2.
Figure 4:
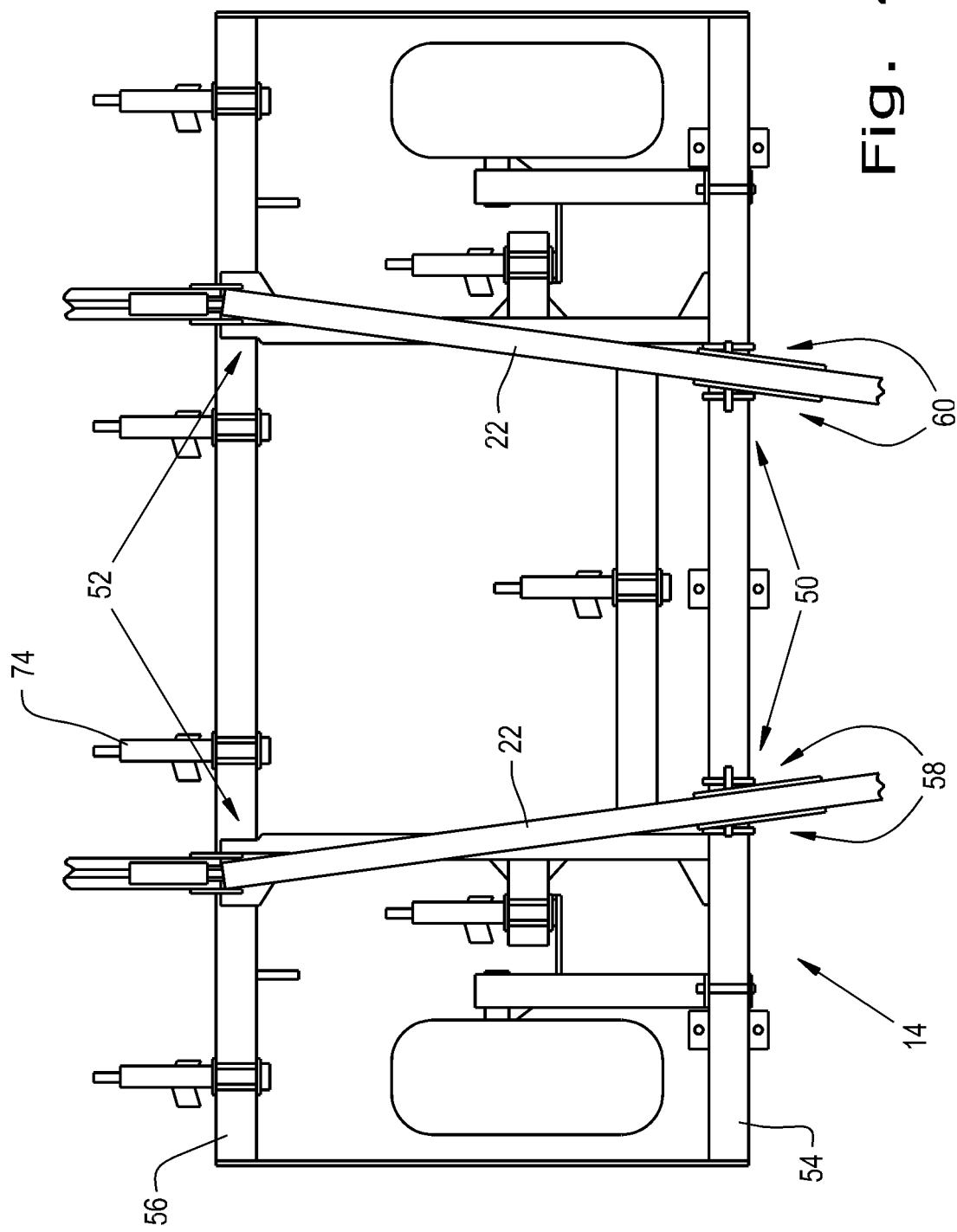
FIG. 4 is a fragmentary top view of the tillage implement shown in FIGS. 1-3.
Figure 5:
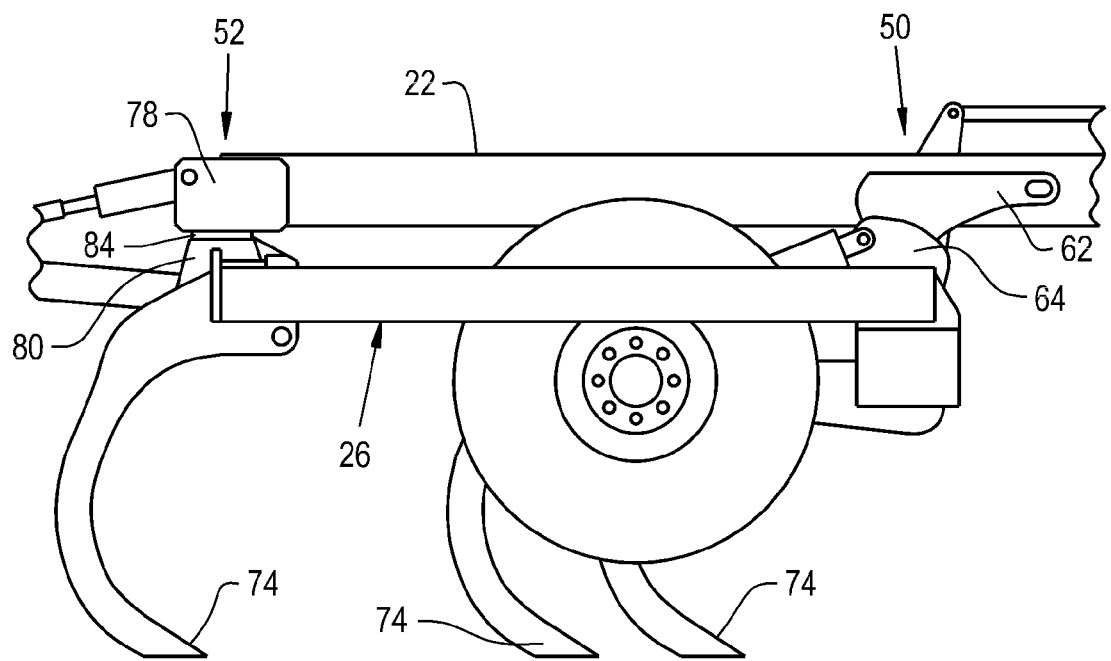
FIG. 5 is a fragmentary side view of the tillage implement shown in FIGS. 1-4.
Figure 6:
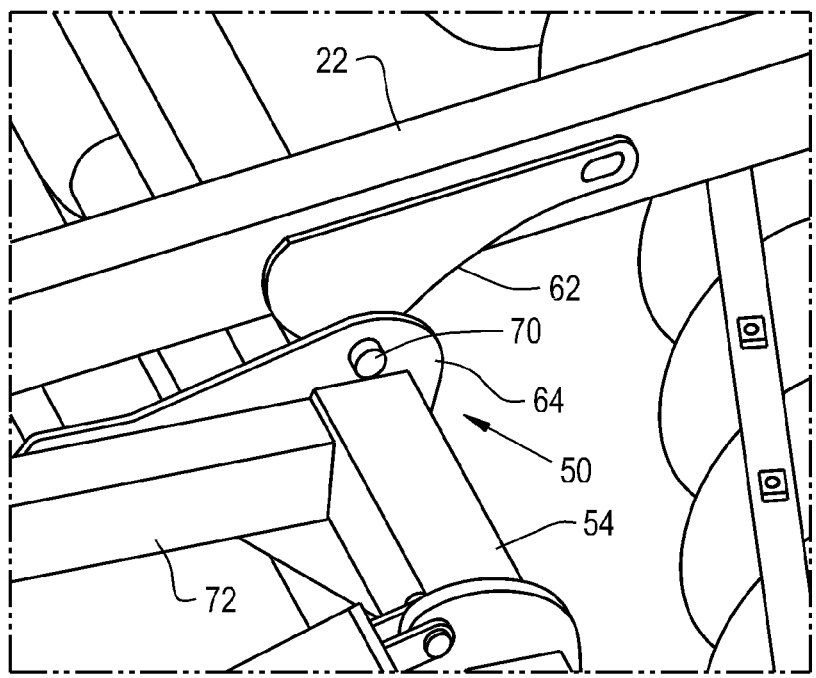
FIG. 6 is a fragmentary top perspective view of the tillage implement shown in FIGS. 1-5.
Figure 7:
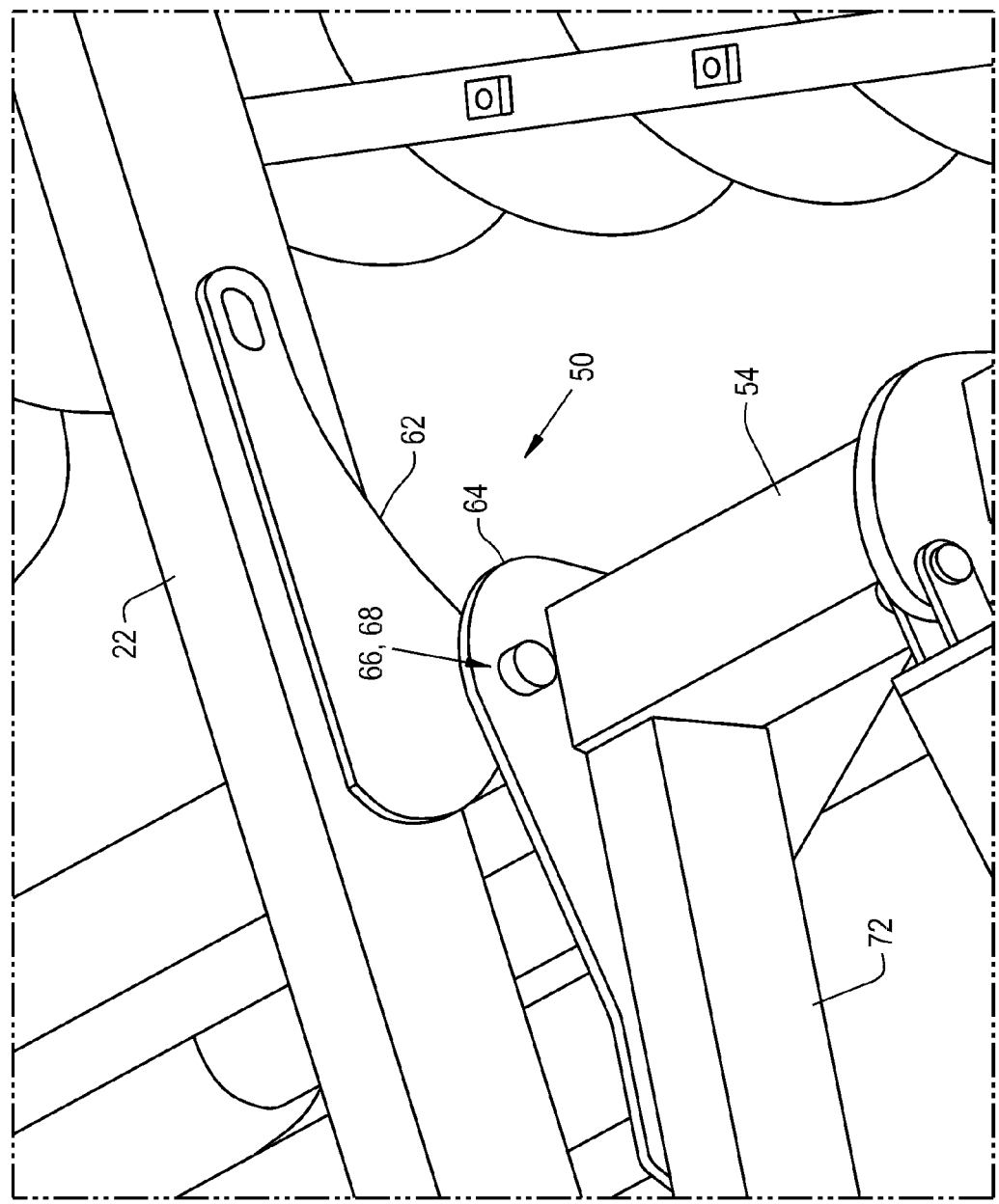
FIG. 7 is another fragmentary top perspective view of the tillage implement shown in FIGS. 1-6.

Referring now to the drawings, and more particularly to FIGS. 1 and 2, there is shown a tillage apparatus 10 which generally includes a tractor 12 and an agricultural tillage implement 14 for tilling and finishing soil prior to seeding.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft directed carrier frame members 22 which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Shank frame 26 includes a plurality of arcuate shanks with tilling points at their lower end for tilling the soil. Rear implement 28 includes a secondary frame 30, leveling blades 32 and rolling (aka, crumbler) basket assemblies 34, which coact with each other to finish the soil in preparation for planting. Leveling blades 32 and rolling basket assemblies 34 are both attached to secondary frame 30.

Wheels 36, only one of which is shown, are actuated from tractor 12 to raise or lower the carrier frame members 22 to place the tillage implement 14 in a transport position with the wheels 36 supporting the implement above the ground and an operating position in which the tillage implement 14 is used to till the soil.

Carrier frame members 22 also carry a disk frame assembly 38 which provides support for gangs of disk blades 39 positioned forward from shank frames 26. The disk frame assembly 38 includes forward and aft frame members 40 and 42, respectively, to which the gangs of disk blades 39 are connected.

Referring now to FIGS. 3-8, shank frame 26 is coupled with carrier or longitudinal frame members 22 using a pair of horizontal attachment arrangements 50 at the front of shank frame 26, and a pair of rear attachment arrangements 52 at the rear of shank frame 26. More particularly, shank frame 26 includes a front cross member 54 and a rear cross member 56 which are each disposed under the pair of longitudinal frame members 22. Each horizontal attachment arrangement 50 includes a first pair of generally vertical plates 58 and a second pair of generally vertical plates 60 that are disposed on opposite sides of a respective longitudinal frame member 22. Each pair of vertical plates 58 and 60 includes a generally vertical first plate 62 attached to longitudinal frame member 22, and a generally vertical second plate 64 attached to front cross member 54. First plate 62 includes a first through hole 66 and second plate 64 includes an aligned second through hole 68. The through holes in the first pair of plates 58 on one side of longitudinal frame member 22 align with the through holes on the opposite side of the second pair of plates 60 such that a single pivot pin 70 passes through all of the aligned through holes. This arrangement places each horizontal attachment arrangement 50 in a double shear configuration, requiring that the pivot pin 70 would have to be sheared in two locations in order for the joint to fail. The pivot pin 70 can be, e.g., a hardened pin (FIG. 6) or a hardened bolt (FIG. 8) extending through the aligned through holes 66 and 68.

In the illustrated embodiment, first plate 62 is welded to a side of the longitudinal frame member 22, and second plate 64 is welded to the top of front cross member 54. Second plate 64 is positioned alongside of a sub-frame member 72 which extends generally longitudinally from front cross member 54, and forms part of shank frame 26. Second plate 64 may also be welded to the side of sub-frame member 72 to provide additional strength to the joint.

During field operation, shanks 74 extending downwardly from shank frame 26 dig into the soil and may be configured as sub-soiling shanks to break up the hard pan at a particular depth below the surface of the soil. This ripping/sub-soiling of the soil causes the front end of the shank frame 26 to pull downwardly, and the rear end of the shank frame 26 to push upwardly. This downward pivoting or pulling action at the front of shank frame 26 causes the stresses on each of first plate 62 and second plate 64 to be in tension loading. The use of two pairs of vertical plates on opposite sides of the longitudinal frame members 22, with the pivot pins extending through the aligned through holes in the plates, provides the double shear arrangement which would require that the two pins be each sheared in two locations in order for the front of sub-frame 26 to separate from the longitudinal frame members 22. Shanks 74 can be differently configured, such as chisel plow shanks, and the same type of loading occurs on the horizontal attachment arrangements 50.

Figure 8:
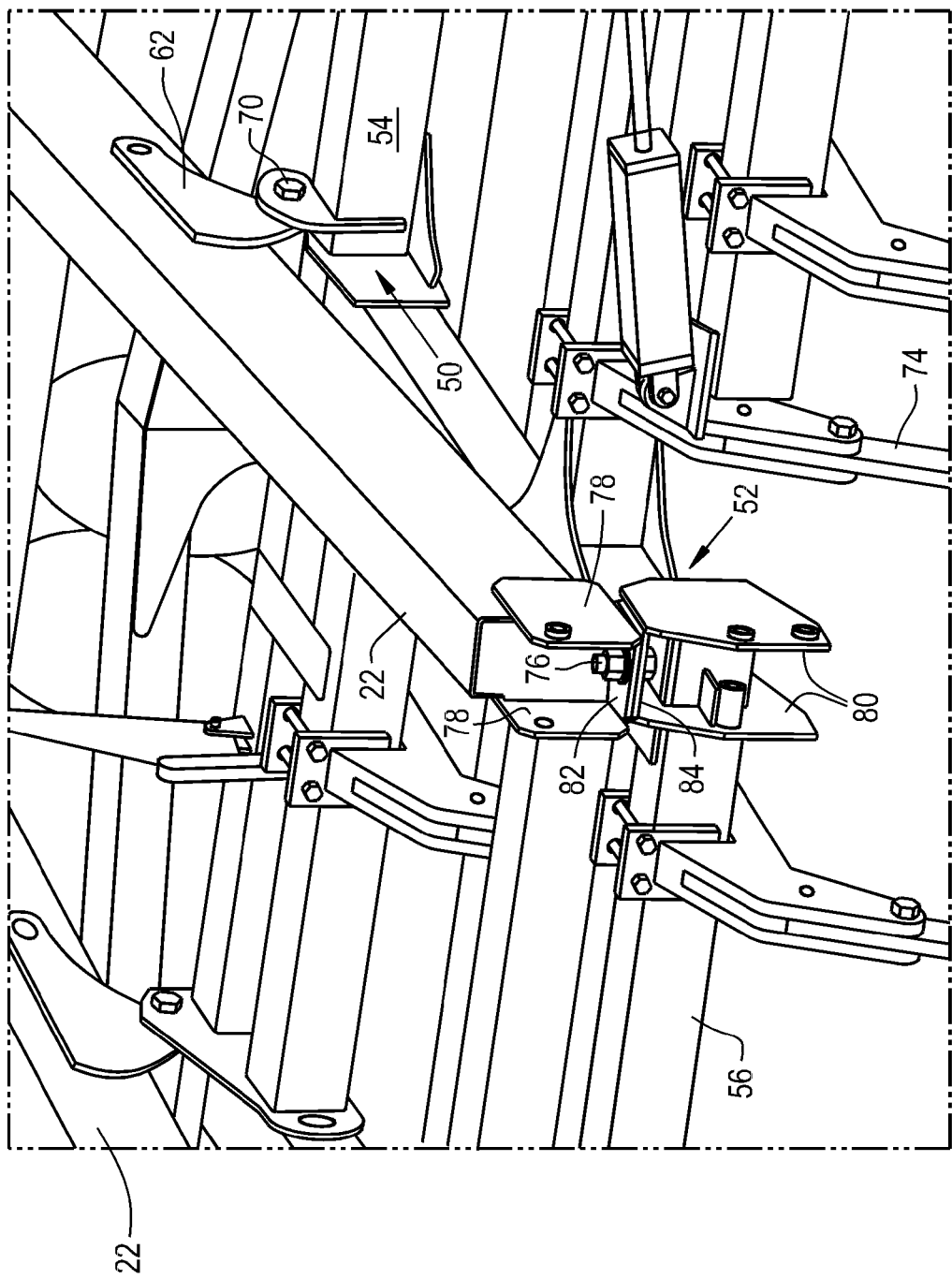
FIG. 8 is a perspective view showing the rear attachment arrangement at the rear end of the longitudinal frame member.
Figure 9:
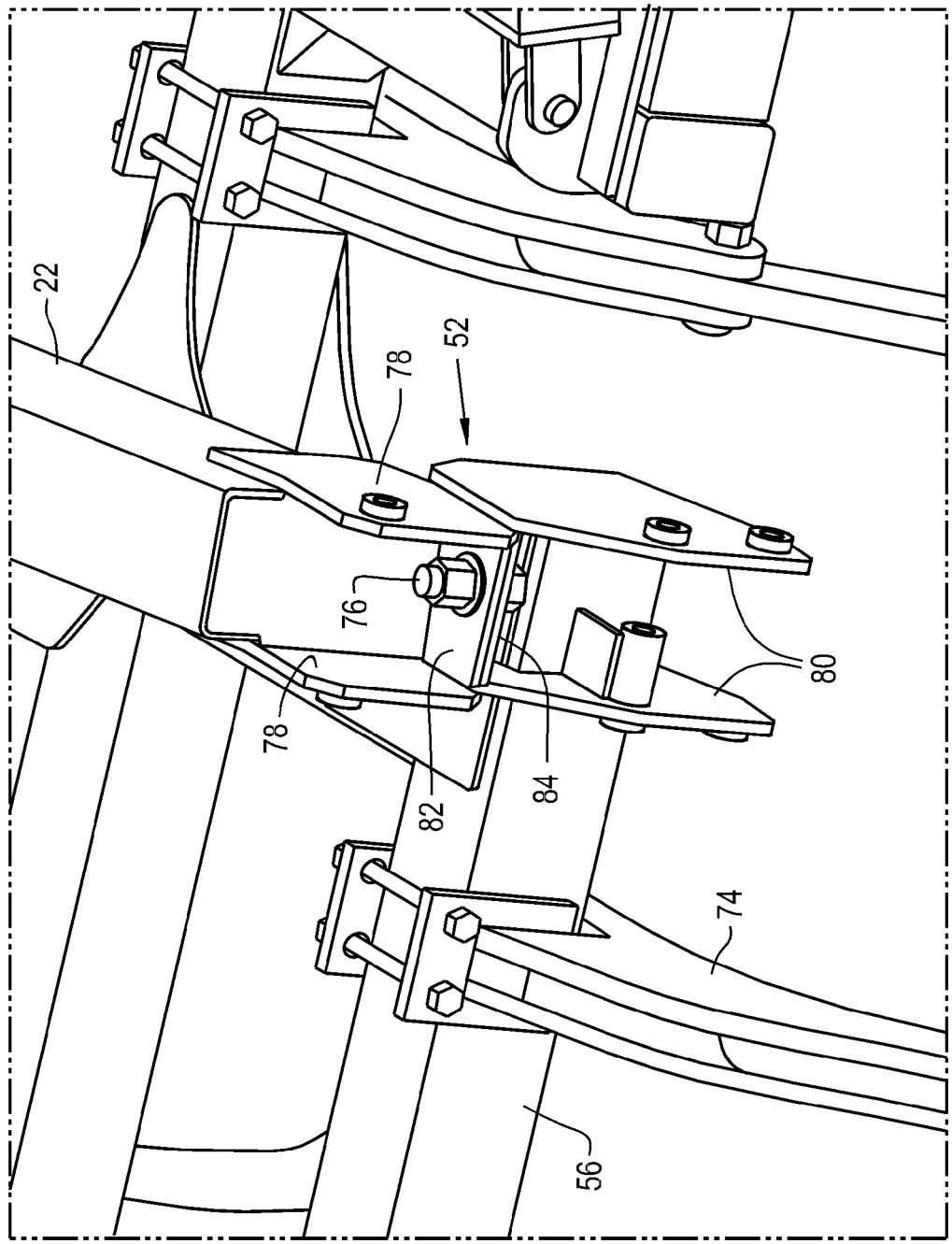
FIG. 9 is another perspective view showing the rear attachment arrangement at the rear end of the longitudinal frame member.

Referring now to FIGS. 8 and 9, rear attachment arrangement 52 may be in the form of a vertical bolted connection using a bolt 76 which places the connection under compression loading, since the rear cross member 56 pushes up into the rearward end of longitudinal frame member 22. More particularly, the rear attachment arrangement 52 includes a first pair of generally vertical plates 78 attached to and extending rearwardly from respective opposite sides of the rear end of the longitudinal frame member 22, and a second pair of generally vertical plates 80 attached to and extending upwardly from the rear cross frame member 56. A first horizontal plate 82 extends between and is attached to the first pair of generally vertical plates 78, and a second horizontal plate 84 extends between and is attached to the second pair of generally vertical plates 80. Each of the first horizontal plate 78 and second horizontal plate 80 have respective holes (not numbered) which are aligned with each other. The bolt 76 passes through the aligned holes and clamps the first horizontal plate 78 against the second horizontal plate 80.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a carriage frame assembly including a longitudinal frame member extending in a travel direction, a forward cross frame member extending transverse to said longitudinal frame member, and a rear cross frame member extending transverse to said longitudinal frame member;
   a horizontal attachment arrangement interconnecting said longitudinal frame member with said forward cross frame member, said horizontal attachment arrangement including a generally vertical first plate which is welded to said longitudinal frame member and having a first through hole, a generally vertical second plate which is welded to said forward cross frame member and having a second through hole, and a pin commonly extending through each of said first through hole and said second through hole; and
   a sub-frame member extending generally longitudinally from said forward cross frame member to said rear cross frame member, said second plate being attached to said sub-frame member,
   wherein said first plate and said second plate define a first pair of plates, and further including a second pair of said plates on an opposite side of said longitudinal frame member, wherein said vertical second plate of said second pair of plates is attached to said forward cross frame member at a position that is at least a width of said longitudinal frame member away from a position at which said vertical second plate of said first pair of plates is attached to said forward cross frame member such that only one of said vertical second plates is attached to said sub-frame member, and wherein said pin extends through each of said first pair of plates and said second pair of plates.

2. The agricultural tillage implement of claim 1, wherein each of said first plate and said second plate are capable of being placed under tension under tensile forces transmitted by said pin.

3. The agricultural tillage implement of claim 1, further including a rear attachment arrangement which connects a rear end of said longitudinal frame member with said rear cross frame member, said rear attachment arrangement capable of being under compression loading.

4. The agricultural tillage implement of claim 3, wherein said rear attachment arrangement includes a first horizontal plate attached to and extending from said rear end of said longitudinal frame member, and a second horizontal plate attached to said rear cross frame member, each of said first horizontal plate and said second horizontal plate having respective holes which are aligned with each other, and further including a bolt passing through the aligned holes and clamping said first horizontal plate against said second horizontal plate.

5. The agricultural tillage implement of claim 4, wherein said rear attachment arrangement includes a first pair of generally vertical plates extending rearwardly from respective opposite sides of said rear end of said longitudinal frame member, and a second pair of generally vertical plates extending upwardly from said rear cross frame member, said first horizontal plate extending between and attached to said first pair of generally vertical plates, and said second horizontal plate extending between and attached to said second pair of generally vertical plates.

6. The agricultural tillage implement of claim 1, wherein said pin comprises a hardened bolt.

7. An agricultural tillage implement, comprising:
a carriage frame assembly including a longitudinal frame member extending in a travel direction, and a forward cross frame member extending transverse to said longitudinal frame member, and a rear cross frame member extending transverse to said longitudinal frame member;
a horizontal attachment arrangement interconnecting said longitudinal frame member with said forward cross frame member, said horizontal attachment arrangement including a generally vertical first plate which is welded to said longitudinal frame member and having a first through hole, a generally vertical second plate which is welded to said forward cross frame member and having a second through hole, and a pin commonly extending through each of said first through hole and said second through hole;
a rear attachment arrangement which connects a rear end of said longitudinal frame member with said rear cross frame member, said rear attachment arrangement capable of being under compression loading; and
a sub-frame member extending generally longitudinally from said forward cross frame member to said rear cross frame member, said second plate being attached to said sub-frame member,
wherein said first plate and said second plate define a first pair of plates, and further including a second pair of said plates on an opposite side of said longitudinal frame member, wherein said vertical second plate of said second pair of plates is attached to said forward cross frame member at a position that is at least a width of said longitudinal frame member away from a position at which said vertical second plate of said first pair of plates is attached to said forward cross frame member such that only one of said vertical second plates is attached to said sub-frame member, and wherein said pin extends through each of said first pair of plates and said second pair of plates.

8. The agricultural tillage implement of claim 7, wherein each of said first plate and said second plate are capable of being placed under tension under tensile forces transmitted by said pin.

9. The agricultural tillage implement of claim 8, wherein said rear attachment arrangement includes a first horizontal plate attached to and extending from said rear end of said longitudinal frame member, and a second horizontal plate attached to said rear cross frame member, each of said first horizontal plate and said second horizontal plate having respective holes which are aligned with each other, and further including a bolt passing through the aligned holes and clamping said first horizontal plate against said second horizontal plate.

10. The agricultural tillage implement of claim 9, wherein said rear attachment arrangement includes a first pair of generally vertical plates extending rearwardly from respective opposite sides of said rear end of said longitudinal frame member, and a second pair of generally vertical plates extending upwardly from said rear cross frame member, said first horizontal plate extending between and attached to said first pair of generally vertical plates, and said second horizontal plate extending between and attached to said second pair of generally vertical plates.

11. The agricultural tillage implement of claim 7, wherein said pin comprises a hardened bolt.

* * * * *